United States Patent [19]

Larkin et al.

[11] Patent Number: 4,674,060
[45] Date of Patent: Jun. 16, 1987

[54] METHOD AND APPARATUS FOR COUNTING CURRENCY AND FOR CONFIRMING THE COUNT OF STRAP CURRENCY

[75] Inventors: Francis Larkin, Trenton, N.J.; Jeffrey Amey, Levittown, Pa.

[73] Assignee: Brandt, Inc., Bensalem, Pa.

[21] Appl. No.: 634,133

[22] Filed: Jul. 25, 1984

[51] Int. Cl.$^4$ ............... G01G 19/40; G01G 23/00; G01G 23/38; G06M 21/37
[52] U.S. Cl. ............... 364/567; 364/575; 177/25; 177/200; 377/8; 377/22
[58] Field of Search ............... 364/466, 567, 568, 575, 364/709, 151, 154, 571; 177/25, 50, 200, 5, 34; 377/8, 22

[56] References Cited

U.S. PATENT DOCUMENTS

| | | | |
|---|---|---|---|
| 4,031,365 | 6/1977 | Raggiotti et al. | 235/151.3 |
| 4,157,738 | 6/1979 | Nishiguchi et al. | 177/1 |
| 4,219,089 | 8/1980 | Gard et al. | 177/200 |
| 4,447,885 | 5/1984 | Biss | 364/568 |
| 4,490,800 | 12/1984 | Powers | 364/558 |
| 4,512,428 | 4/1985 | Bullivant | 364/568 |
| 4,549,620 | 10/1985 | Dee et al. | 364/567 |

FOREIGN PATENT DOCUMENTS 2155190 9/1985 United Kingdom .

Primary Examiner—Errol A. Krass
Assistant Examiner—Daniel W. Juffernbruch
Attorney, Agent, or Firm—Shenier & O'Connor

[57] ABSTRACT

A scale under microprocessor control weighs each batch of currency. The weight measurement is compared against predetermined stored weight values to determine if the currency being weighed is strap currency or unstrapped currency and to determine the range of the currency count. Dependent upon the result of these comparisons, the proper routine is selected during which the last currency measurement is compared against the measurement criteria of the selected routine to either confirm the accuracy of the count or indicate an error. An average strap value is created from a table of stored values for at least one of the strap quantities and is updated each time a strap of that quantity is weighed. The averaging technique employed creates an average from the weights of the last ten straps of that quantity measured, and which are stored in the table. The averaging is performed after the table is updated. From this average, the value for each strap quantity and each single bill is recalculated and stored in memory in readiness for subsequent counting operations and/or verificiations. A table of stored values is created for each bill denomination.

21 Claims, 8 Drawing Figures

METHOD AND APPARATUS FOR COUNTING CURRENCY AND FOR CONFIRMING THE COUNT OF STRAP CURRENCY

BACKGROUND OF THE INVENTION

Strap currency is defined as a wrapped bundle of a predetermined quantity of paper currency of the same denomination. For example, strap currency is typically prepared and wrapped in bundles of 100 one dollar bills; 100 five dollar bills; 100 ten dollar bills; and so forth. Quantities of fifty bills of the same denomination are also frequently prepared. These wrapped bundles are prepared by retail establishments, small banks and the like, and are presented to larger banks, clearing houses, and/or Federal Reserve branches, together with a statement identifying the number of the bundles of strap currency, their denomination, and so forth.

It is desirable, and in many cases required, to confirm that the number of bills, i.e. the counts of each of the strap currency received at the clearance house are, in fact, accurate. In addition thereto, it is desirable to be able to count at least small quantities of unstrapped currency and to further be assured that the strap currency is properly averaged to take into account the deviations in unit currency weight due to normal wear and tear experienced by paper currency, as well as the effect of foreign matter upon currency weight, such as dirt, moisture, foreign materials or objects such as adhesive tape and paper clips utilized to repair currency, and so forth. It is also most efficient to verify the bundle count without the necessity for unwrapping, counting and rewrapping the strap currency.

BRIEF DESCRIPTION OF THE INVENTION

The present invention is characterized by comprising a hardware system including a microprocessor interfaced with an electronic scale and a manually-operable keyboard.

The electronic scale is designed to accommodate a pack of paper currency, either strapped or unstrapped, and is provided with a visually observable digital display for displaying a numeric value representing the bundle weight.

The bundle weight value is transferred to the microprocessor for evaluation. Assuming that the calibration being performed is the first calibration, the bundle weight is stored in ten separate memory locations, forming a special table; the bundle weight is also multiplied by ten, the first stored value is subtracted from the ten-pack weight; all the other stored values are moved up one position; the new weight is placed in the tenth position; and a correction factor is introduced to compensate for inaccuracy in the weight measurement due to binary notation and to allow for strap weight. The resulting sum is then divided by ten and stored in low and high storage locations. A factor is added to the low and high storage locations respectively, the total average weight is divided by one hundred to obtain the single bill weight; a factor is added to the single total in the table. This process is repeated twenty-five times to create a table of weights for counts from one to twenty-five bills.

Thereafter, the tables created in the manner described hereinabove are then utilized to create low and high values for a fifty count strap.

The same operation is performed for the denominations for each strap, i.e. $1, $2, $5, $10, $20, $50, $100 and the like. The storage of data for each bill denomination takes fully into account the differences in the amount of printing on each bill denomination and the resulting effect of these differences on bill weight.

To verify a currency strap, a weight measurement is taken and an identification of the strap size and denomination is provided. The microprocessor compares the currency strap weight produced by the scale against the high-low weight limits stored in memory. A visual indication is provided of the strap weight, i.e., an indicator that the strap weight falls within the present tolerances, or is above or below the acceptable weight range.

As each new measurement is made, the measurement value is introduced into the average, the oldest measurement of the group of ten being removed to allow for introduction of the most recent measurement. The average strap weight and upper and lower weight limits are automatically recalibrated each time a measurement is made. The piece weights (1 through 25) are also recalibrated at the same time.

The system automatically determines the range of the bundle being verified or counted. If the bundle weight is greater than a first predetermined value, the bundle being weighed is compared against the stored values for a one hundred bill strap. In the event that the bundle weight is less than the aforesaid first amount but greater than a second predetermined amount, the bundle weight is compared against the stored values for a fifty bill strap. In the event that the bundle weight is less than the aforesaid second amount and greater than a third predetermined amount, the bundle weight is compared against the values stored for individual bill counts.

In the case where an unstrapped quantity of bills is being weighed for counting purposes, the bundle weight is compared against the high and low acceptable weights for each possible count from one through twenty-five.

In all three weight comparison operations, the weight of the last bundle of 100 to be accepted is introduced into the stored data to update the averages for each particular weighing and/or counting condition.

OBJECTS OF THE INVENTION AND BRIEF DESCRIPTION OF THE FIGURES

It is therefore one object of the present invention to provide novel apparatus for automatically verifying strap currency counts employing a weighing technique.

Still another object of the present invention is to provide novel method and apparatus for automatically verifying a strap currency count and/or counting unstrapped currency employing a weighing technique.

Still another object of the present invention is to provide novel method and apparatus for verifying the count of strapped currency and/or counting unstrapped currency through the employment of a weighing technique and further utilizing the weight value of each weighed bundle for updating the stored values against which the bundles to be verified and/or counted are compared.

The above, as well as other objects of the present invention, will become apparent when reading the accompanying description and drawing in which.

DETAILED DESCRIPTION OF THE INVENTION

Figure 1:
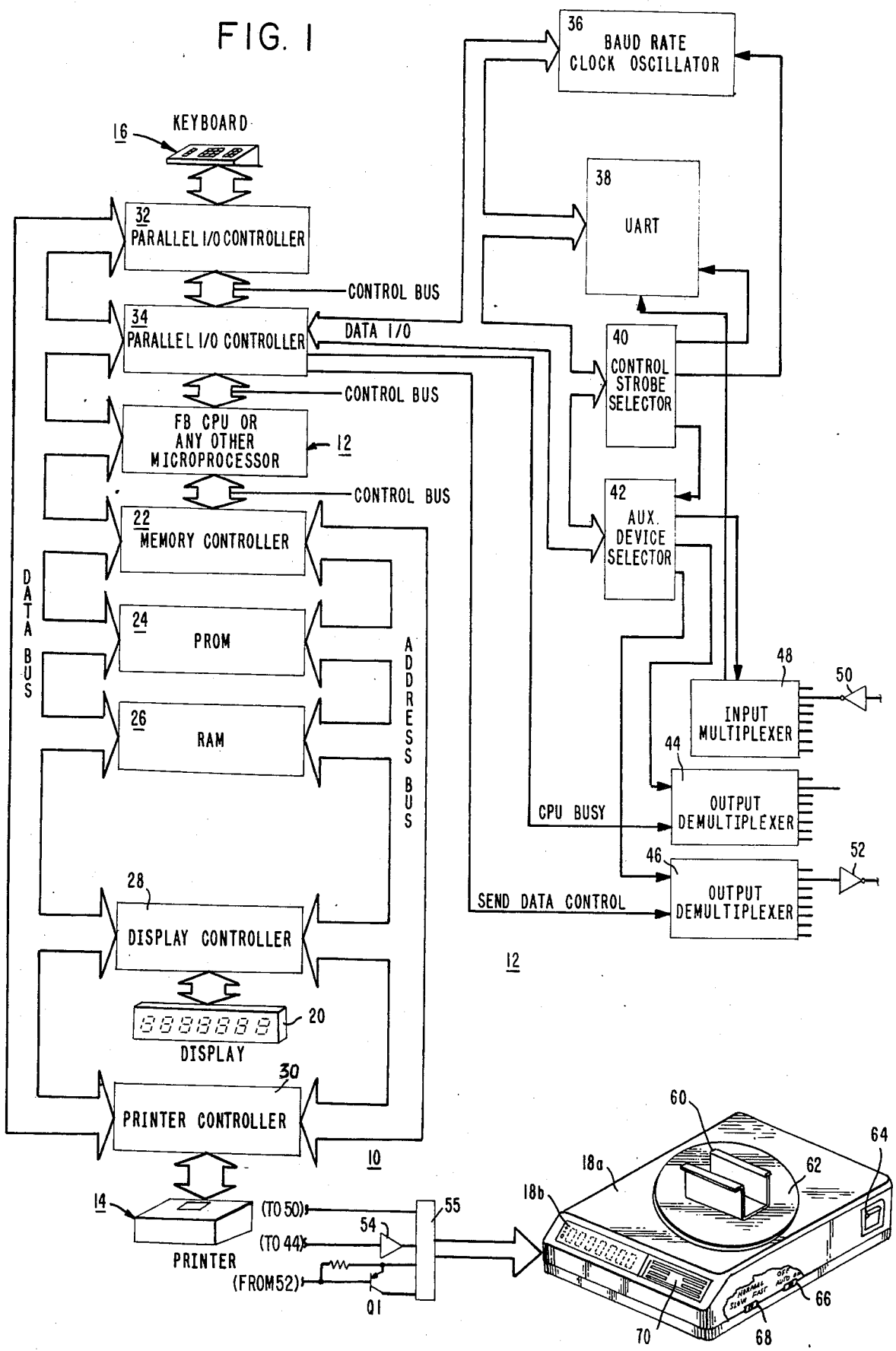
FIG. 1 shows a weighing and counting system partially in perspective and partially in diagrammatic fashion.

The system 10 of the present invention is shown in FIG. 1 and is comprised of a CPU 12 coupled to a printer 14, keyboard 16, electronic scale 18 and display 20.

The CPU 16 is preferably a model F8 CPU manufactured by both Fairchild and Mostek.

CPU 12 interfaces with a memory controller 22, a programmable read-only memory (PROM) 24, a random access memory (RAM), display controller 28 and printer controller 30. Parallel input/output (I/O) controller 32 couples keyboard 16 with CPU 12. I/O controller 34 couples CPU 12 with oscillator 36, UART (Universal Automatic Receiver/Transmitter) 38, control strobe selector 40, auxiliary device selector 42, and demultiplexers 44 and 46.

Multiplexer 48 couples data derived from solid state scale 18 to UART 38. Demultiplexers 44, 46 couple signals from the CPU to the solid state scale 18 to operate the scale. UART 38 is a two-way parallel to serial converter and is employed in the system shown in FIG. 1 to convert serial data from scale 18 to parallel data for transfer to CPU 12.

The solid state scale is preferably of the type described, for example, in U.S. Pat. Nos. 3,986,012 and 4,139,069, and it is sufficient for purposes of the present invention to understand that the electronic scale is capable of providing a binary output representing the weight of the measured bundle. Scale 18 is provided with its own visual display 18b for displaying in decimal form the weight of the bundle placed within the U-shaped receiving bracket 60 mounted upon the weighing platform 62 arranged upon the top surface of the scale housing 18a. A separate off/on switch 64 is provided as are a pair of three position switches 66 and 68 for selecting the responsive time, i.e. settling time, of the scale (slow, normal or fast) and for selectively omitting or including the decimal position for reading in hundredths of a gram. The off position omits the hundredths position from the display. The on position includes the hundredths position in the display. The automatic position omits the hundredths position from the display when the scale is setting. A depressible tare touch pad 70 enables the solid state scale to automatically adjust its "zero" weight to compensate for the weight of the platform 62, bundle holder 60 and the like.

Figure 2A:
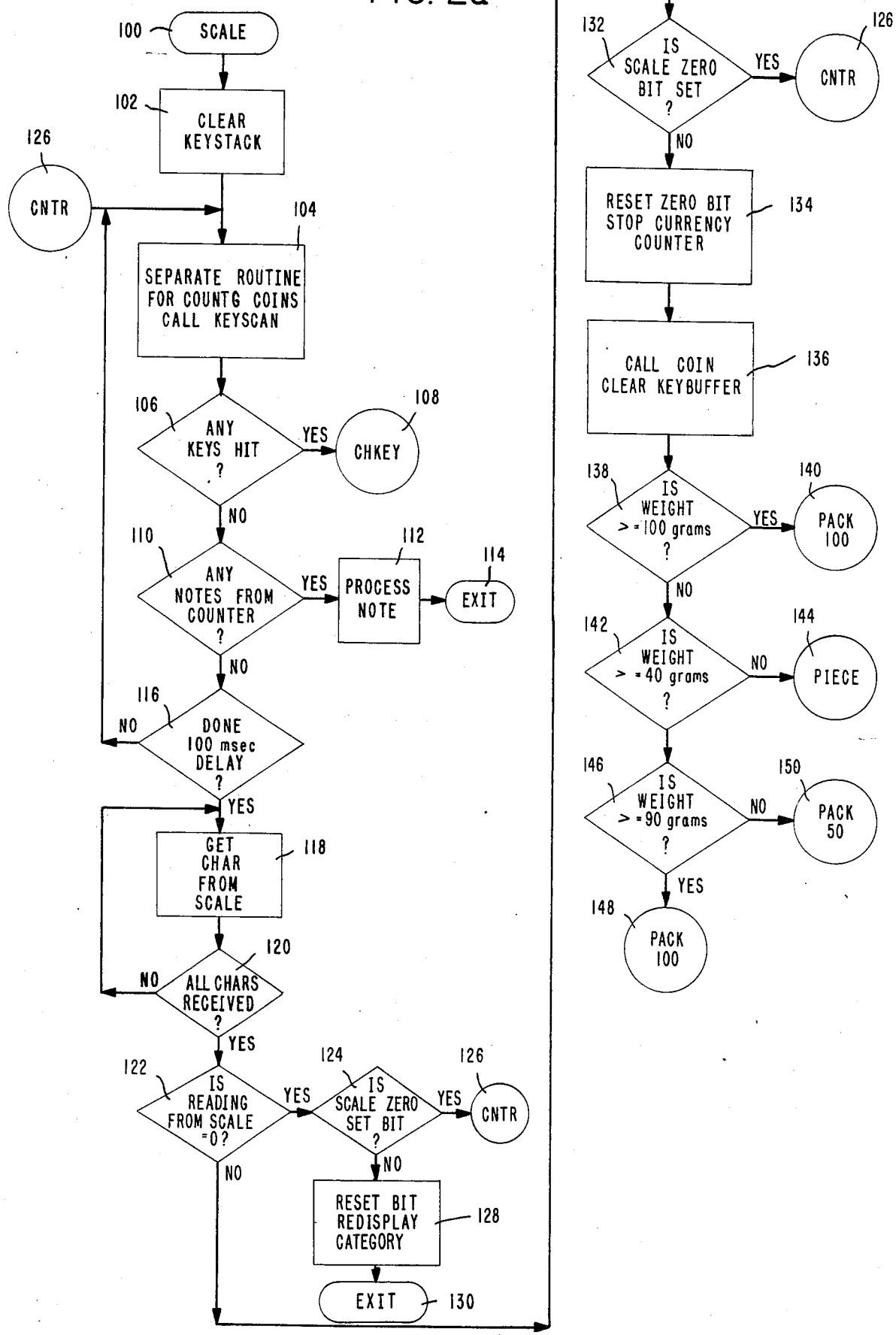
FIGS. 2a through 2g are flow diagrams useful in explaining the operating method employed in the system shown in FIG. 1.

The operation of the system 10 is as follows:

Considering FIG. 2a, when the scale routine is called at 100, the RAM memory 26 is cleared at 102. At 104, the keyboard 16 is scanned. The CPU 12 at 106 determines if any keys have been hit. If any keys have been depressed, the identity of the depressed key or keys is determined at 108.

If no keys have been depressed, the CPU at 110 determines if any notes have been counted from the counter. This step relates to the capability of the system of FIG. 1 to be integrated with a document counter (not shown) and to process this count. If a note count is present in the counter, the note count is processed at 112 and the CPU exits from the scale routine at 114. If no note count has been developed by the counter, and a 100 millisecond delay has expired as of 116, characters are transferred, one ASCII character at a time, from electronic scale 18. This is accomplished by selecting (i.e., enabling) scale 18 through demultiplexer 44 and providing a data control signal through demultiplexer 46 instructing the electronic scale 18 to transmit the data one character at a time. In the preferred embodiment, an RS 232 interface 55 is utilized between scale 18 and the CPU 12. The interface unit 55 can simultaneously send and receive one character at a time between CPU 12 and scale 18.

At 120, a count of the number of characters received is retained and until all characters are received, the CPU continues to loop between steps 118 and 120.

When all characters have been received, the scale reading is examined at 122. If the scale reading is zero and the scale zero bit is set, at 124, the routine branches at 126 to return to step 104 to again scan keyboard 16.

In the event that the scale zero bit is not set, and the scale reading is zero, the scale zero bit is reset at 128, the category is redisplayed and CPU 12 exits from the scale routine at 130 to return to the main program.

In the event that the reading from the scale is not zero, at 122, and the scale zero bit is set, the routine branches at 126 to return to the scanning keyboard step 104.

In the event that the scale zero bit is not set, the zero bit is reset and the currency counter which, as was previously mentioned, may be coupled to CPU 12, is halted to prevent an operator from simultaneously weighing currency with scale 18 and counting currency with a currency counter (not shown for purposes of simplicity). After these operations are completed at step 134, the data representing the depressed keys of keyboard 16 stored in the key buffer is cleared from the key buffer at 136.

The weight of the bundle which has been placed within the bundle holder 60 is compared against a weight value stored in memory representing 100 grams. If the weight value of the bundle presently being weighed is greater than 100 grams, the computer branches to the pack 100 subroutine shown in FIG. 2b, as will be more fully described. In the event that the weight of the bundle in holder 60 is less than 100 grams, CPU 12 at step 140 compares the weight of the bundle against a weight value of 40 grams stored in memory. If the weight value of the bundle is less than 40 grams, the CPU branches at 144 to the piece routine shown in FIG. 2c. In the event that the weight of the bundle in holder 60 is greater than 40 grams, the CPU 12 at step 146 compares the bundle in holder 60 with a value in a value stored memory representing 90 grams. If the bundle in holder 60 weighs more that 90 grams, the CPU branches at 148 to the pack 100 subroutine shown in FIG. 2b. In the event that the bundle in holder 60 is less than 90 grams, the CPU 12 branches at 150 to the pack 50 subroutine shown in FIG. 2d.

Figure 2B:
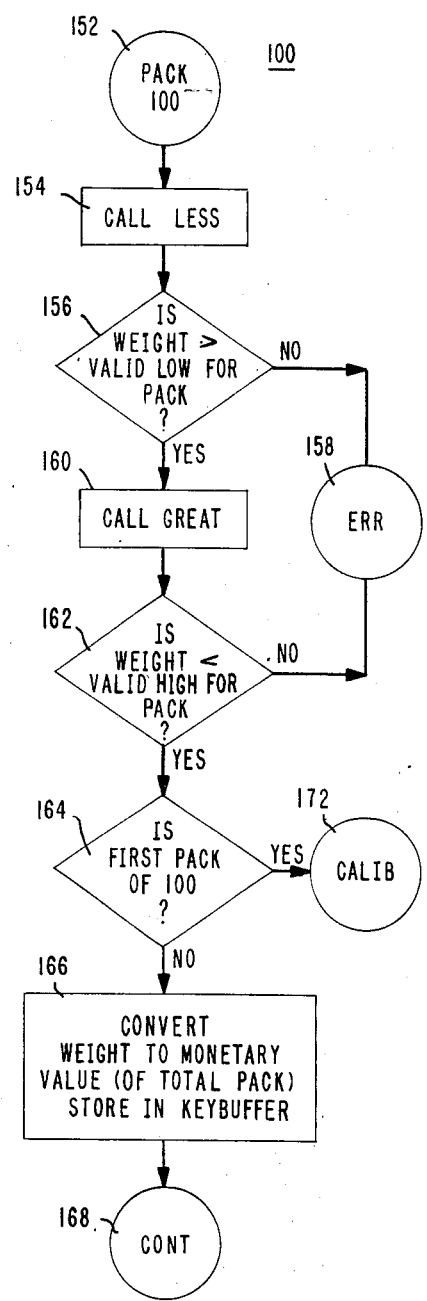

The pack 100 subroutine shown in FIG. 2b is entered either from step 140 or 148 of FIG. 2 and advances from 152 to step 154 where the "less" value is called out from memory. The "less" value is the lower weight limit for a valid one hundred bill currency strap of the desired denomination. The valid low for the strap is compared against the weight of the bundle in holder 60. If the weight is less than the valid low, an error signal is provided at 158.

If the bundle weight is greater than the valid low, the computer calls the "great" value out of memory which represents the valid high weight for a one hundred bill strap. The bundle weight is compared against the valid high and if the bundle is greater than the valid high, an error signal is given at 158. If the bundle is less than the valid high, then the bundle resides within the valid limits. Obviously the comparison operations may be reversed in that the bundle weight value may first be compared against the valid high and thereafter compared against the valid low.

The CPU 12 keeps a count of the number of currency straps [each currency strap containing one hundred (100) bills] of each denomination measured. In the event that the present bundle is the first such strap being measured, or the operator has requested re-calibration, the program branches at 172 to the Calibrate subroutine shown in FIG. 2e. In the vent that the bundle presently being measured is not the first pack of one hundred bills to be weighed, the weight value is converted to the monetary value of the total pack and stored in the key buffer at 166, and the CPU 12 branches at 168 to the continuation subroutine shown in FIG. 2d.

Figure 2C:
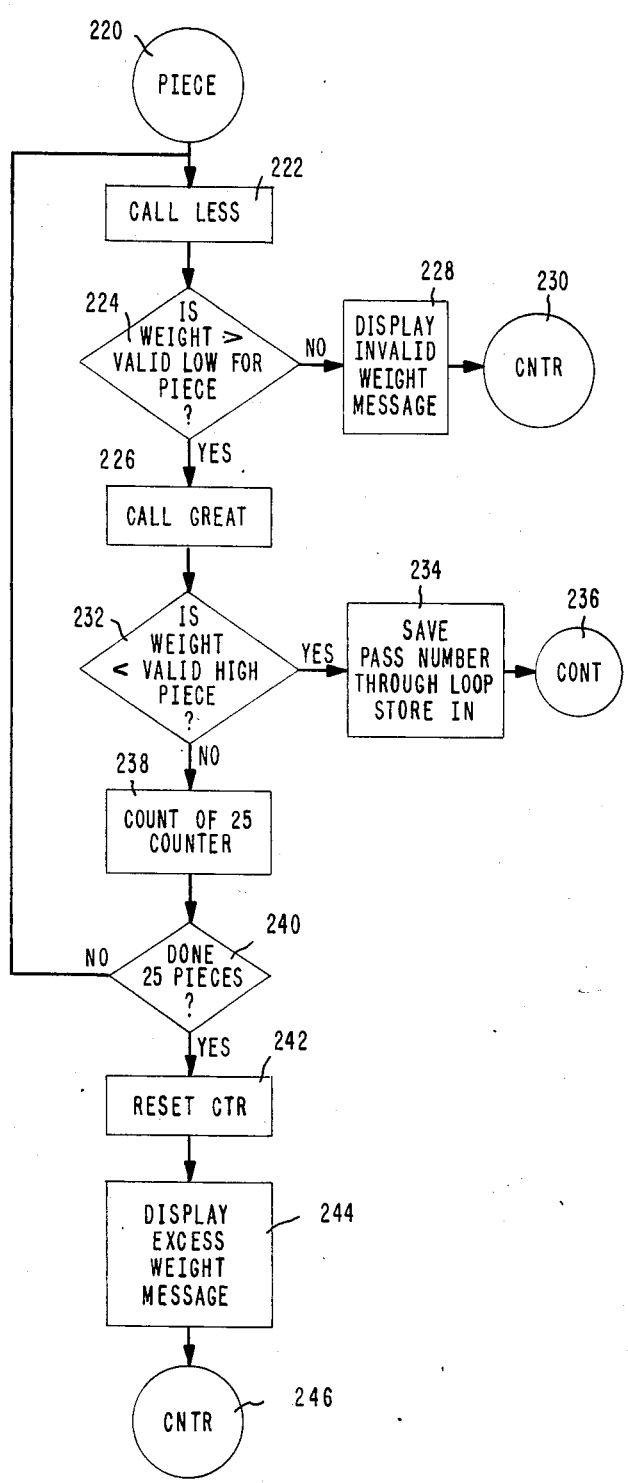
Figure 2D:
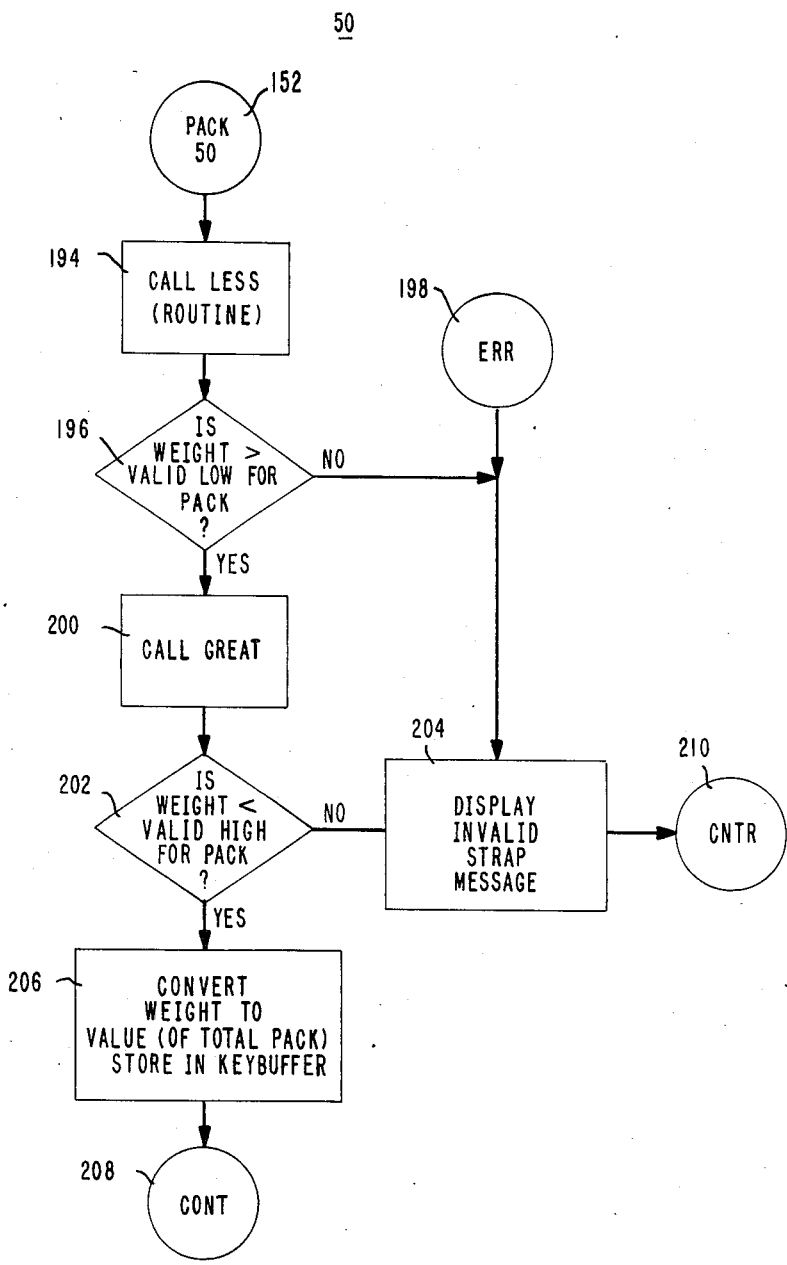

The pack 50 subroutine shown in FIG. 2d is quite similar to the pack 100 subroutine shown in FIG. 2b, and is entered at step 152 and advances to the call less 194 at which time the value representing the valid low limit for a fifty bill strap is called from memory. The value is compared against the bundle in holder 60. The weight comparison is made at 196 and if the bundle weight is less than the weight for a valid low, the error step is entered at 198. If the bundle weight is greater than the valid low, the "great" value is called from memory. The bundle weight is compared against the "great" value and if the bundle weight is greater than the valid high, an invalid strap message is provided at 204. The invalid strap message is also activated when the error advances to step 158 of the subroutine shown in FIG. 2b, step 198, and then step 204 of FIG. 2d, to cause the invalid strap message to be displayed by visual display 20 (FIG. 1). After the invalid strap display is generated, the CPU 12 advances to step 210 to return to the control input 126 to reinitiate a scan of the keyboard 16, shown in FIG. 2a.

Figure 2E:
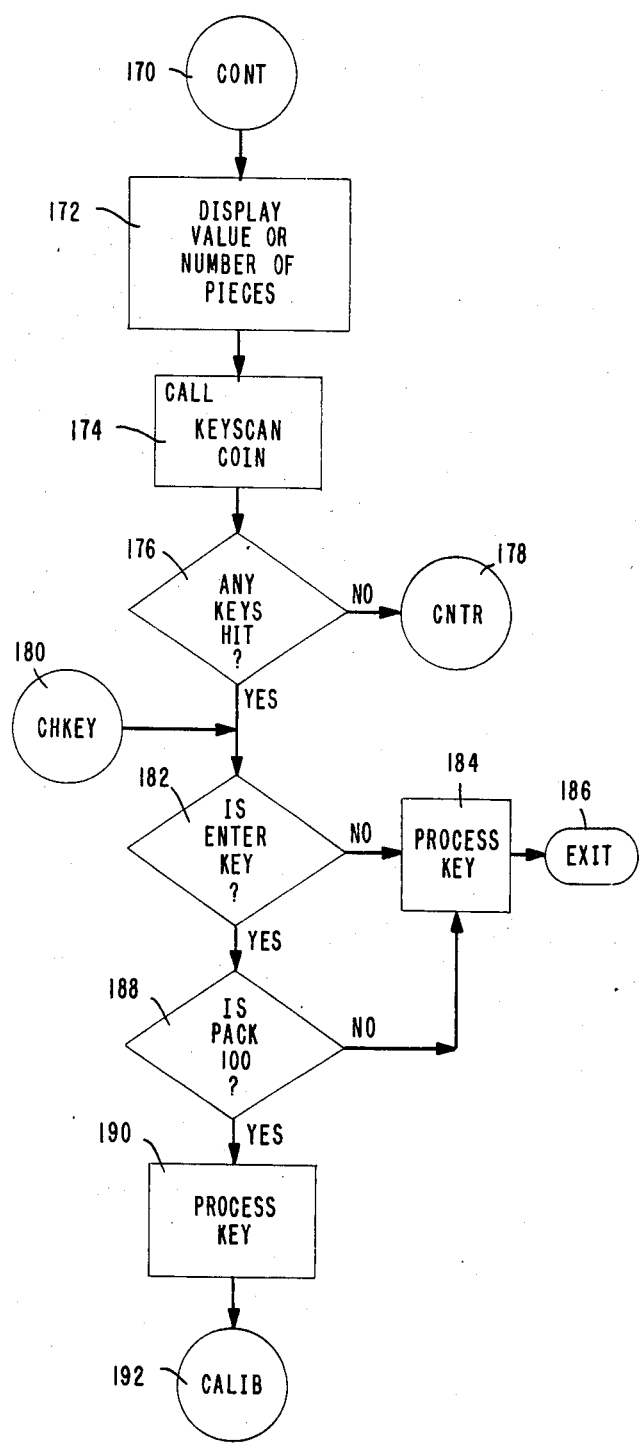
Figure 2G:
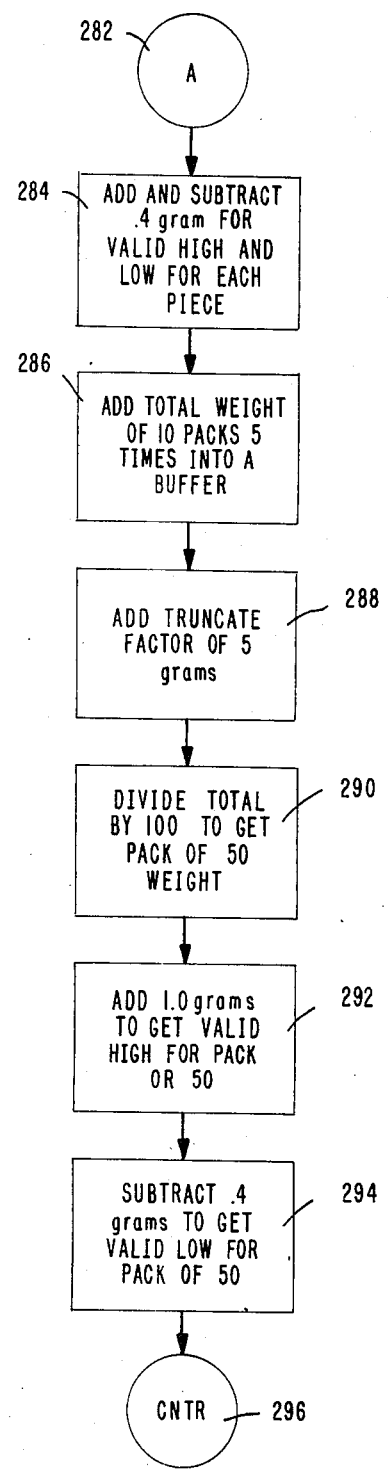

Returning to step 162, if the weight of the bundle is less than the valid high for a fifty bill strap, the weight is converted to the monetary value of the pack of 50 bills and stored in the key buffer 206, and thereafter at step 208, the CPU 12 advances to the continuation subroutine shown in FIG. 2e.

Considering the CONTINUATION subroutine of FIG. 2e which is entered by CPU 12 when either a valid one hundred bill strap or a valid fifty bill strap is present. The CPU 12 advances from step 170 to display the value or total number of bills at 172.

The system of the present invention may also be utilized to accommodate a coin counting operation through the use of apparatus employing a direct counting technique as opposed to apparatus employing a technique of weighing the coins for the purposes of counting.

In the event that any keys have been hit, CPU 12 determines if the enter key has been hit at 182. If the enter key has not been hit, the key is processed at 184 and the CPU exits at 186 to the main program to perform other calculations and summaries of the coins and currency obtained from a particular source.

When the computer branches to the check key step 108, due to the fact that at least one key of keyboard 18 has been operated, the CPU 12 branches out of the routine shown in FIG. 2a at step 108 and enters step 180 shown in FIG. 2e.

If the ENTER key has not been hit, the operated key is processed at step 184, the CPU 12 returns to the main program through step 186. If the key operated is the ENTER key, and the pack being weighed is a one hundred bill strap, the key is processed at 190, and the CPU advances to the calibrate subroutine through step 192.

If the bundle being weighed is not a one hundred bill strap, the key is processed at 184 and the CPU 12 branches to the main program through step 186.

If the ENTER key of the keyboard has been hit, the program advances to step 188 to determine if a one hundred bill stap has been selected. If a one hundred bill strap has not been selected, the program branches to step 184 to process the key and ultimately exit to the main program at 186. If a one hundred bill strap has been selected, CPU 12 branches to 190 to process the key and to enter the calibrate subroutine at 192, the CALIBRATE routine being described and shown in FIG. 2f.

The PIECE subroutine is shown in FIG. 2c and step 220 is entered from step 144 shown in FIG. 2a. CPU 12 at step 222 calls the "less" value stored in memory and compares it with the weight value of unstrapped bundle presently within the holder 60. If the weight value of the bundle is greater than the valid low for a single bill, the "great" value is called from memory at 226. If the weight is less than the valid low for a single bill, the program branches at 228 to display an invalid weight message and advances to step 230 to return to the control input 126 shown in FIG. 2.

If the weight value of unstrapped the bundle is greater than the valid low, the "great" value is called at 226 and is compared against the unstrapped bundle weight corresponding to the count of the number of notes. If the weight is less than the valid high, the number representing the count is passed through the loop and stored in the key buffer at step 234 and advances to step 236 to branch to the CONTINUATION subroutine shown in FIG. 2d.

In the event that the weight of the unstrapped bundle is greater than the valid high weight of a single piece, the counter is incremented at 238 and a determination is made at 240 if twenty-five comparing operations have been performed. In the event that twenty-five comparing operations have not yet been performed, the program branches back to step 222 which calls the greater value for an appropriate unit count bundle. The comparison operations are repeated comparing the unstrapped bundle being weighed against the valid upper and lower limits for a two-bill bundle and providing either an invalid or a valid weight display.

In the event that neither an invalid weight message nor a valid weight condition is obtained, the subroutine continues to repeat the operation calling the upper and lower limit values for each possible unstrapped bundle from a count of one to a count of twenty-five.

In the event that the weight of an unstrapped bundle has a value greater than the valid high for a twenty-five bill unstrapped bundle, at steps 232 and 240, the counter retaining the count is reset to zero at step 242, and thereafter CPU 12 at step 244 causes display 20 in FIG. 1 to display an excess weight message. Thereafter, the CPU 12 advances to the control step 246 to return to the program step 104 through return step 126 shown in FIG. 2.

Figure 2F:
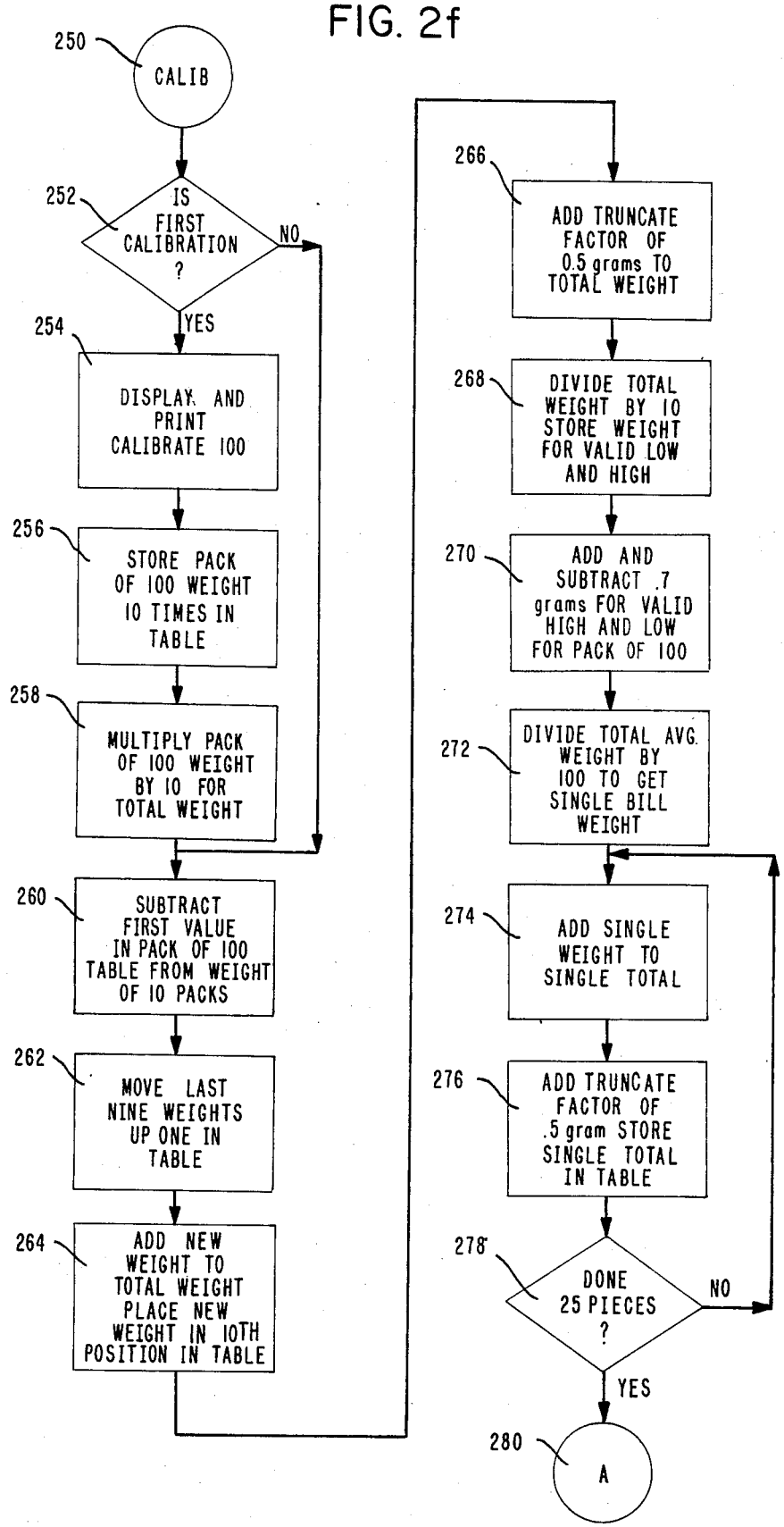

The CALIBRATE subroutine is shown in FIG. 2f. The CALIBRATE subroutine may be entered either from step 172 shown in FIG. 2b or step 192 shown in FIG. 2d. When the CALIBRATE subroutine is entered at 250, CPU 12 advances to step 252 which determines what calibration is being made. Assuming that the calibration presently being made is not the first calibration, the program branches to step 260. In the event that the present calibration is the first calibration, the program branches to step 254 at which time the CPU 12 displays and prints the message "calibrate all". Thereafter, at step 256, the weight of the one hundred bill currency strap is successively stored in ten memory locations forming the one hundred bill currency strap table. Thereafter, the weight of the one hundred bill currency strap presently being measured is multiplied by ten at 258. The weight value $W_1$ in the first table position is subtracted from the ten-pack weight at 260. At 262, the weight value stored in the second through the tenth table positions are each moved up one position in the table. In other words, the weight value $W_1$ in the first position in the table is removed from memory; the weight value $W_2$ in the second position in the table is moved to the first position in the table previously occupied by weight value $W_1$ and so forth. Upon completion of this step, the weight values previously identified as $W_2$ through $W_{10}$ are now stored in the memory positions in the table previously occupied by the weight values $W_1$ through $W_9$.

The weight value of the new one hundred bill strap is then added to the weight obtained at step 260 and is also placed in the tenth position in the table, at step 264.

At step 266, a truncate factor in binary form representing a factor value of 0.5 grams is added to the total weight. This correction factor provides for the rounding of binary coded decimal numbers by truncating to the appropriate decimal place, after addition of the truncate factor. For example, a value of 1.7 is truncated to 2.0 by adding 0.5 to obtain 2.2 which is truncated to 2.0.

Thereafter, at step 268, the total weight obtained at step 266 is divided by ten and is stored in the locations in which the valid low and valid high value for a one hundred bill strap of a particular denomination are stored. Thereafter, at step 270, a binary value representing a decimal value of 0.7 grams is added to the quantity of the valid high location and is subtracted from the quantity of the valid low memory location.

Thereafter, the total average weight is divided by one hundred at step 272 to obtain the single bill weight.

At step 274, the single bill weight value is added to the single total. At 274, a truncate factor in binary form representative of the value of 0.5 grams is added to the single total and stored in the single total position in that portion of memory storing the weight values in the table utilized to count unstrapped bundles having a count of up to twenty-five bills of a particular denomination.

A count is kept of the number of individual operations performed at 278 and when the high and low weights for twenty-five bills have been developed, the CPU 12 advances to step 280 to the A portion of the CALIBRATION subroutine shown in FIG. 2f. When the count is less than twenty-five, the single weight as well as the truncate factor are again added to the single total during each iterative operation to create and store counts representative of the weights of bundles of 1, 2, 3, 4, 5 . . . and 25 bills of unstrapped currency.

Once the twenty-five counts have been completed, the A part of the CALIBRATION subroutine is entered at 282 shown in FIG. 2f, causing the CPU 12 to advance to step 284 which adds and subtracts a binary value equal to 0.4 grams to create the valid high and valid low weights for each piece count of one through twenty-five bills.

Thereafter, at step 286, the total weight of a pack of ten straps (each of 100 bills) previously stored in memory is called from memory and is added five times in a computer buffer, at step 286. Thereafter, at step 288, a truncate factor in the form of a binary number representing the weight value of 5.0 grams is added to the total weight count obtained at step 286. This total, with the truncate factor added, is divided by one-hundred (100) at step 290 to obtain the weight for a strapped fifty bill pack. At step 292, the truncate value of 1.0 grams is added to the fifty bill strap weight to obtain the valid high for a pack of fifty. At 294, a binary value representing 0.4 grams is subtracted from the fifty bill strap weight to obtain the valid low for a pack of fifty. Thereafter, at 296, CPU 12 reenters the program shown in FIGS. 2 at branch input 126.

At this time, all of the data necessary for verifying one hundred bill straps and fifty bill straps and for counting unstrapped currency in bundles of no greater than twenty-five bills, is stored in memory in readiness for any of the permitted verification or counting operations. In the preferred embodiment, the table for the high and low valid weights for one hundred bill straps of each denomination is retained in memory. The same is true for fifty bill straps and for unstrapped bundles of up to twenty-five bills. The use of different tables for each bill denomination has the advantage of fully taking into account different weights per bundle due to differing amount of inks utilized in the printing of each bill denomination.

Each time a one hundred bill strap is measured, updated calibrations are performed for the one-hundred bill strap and the one through twenty-five unstrapped bill bundles, thereby taking into account the most recently weighed hundred bill straps in determining the average bundle weight as well as the individual piece weight.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A method for verifying the accuracy of the count of a previously wrapped bundle of sheets through the use of a computer having a memory and an electronic scale comprising the steps of:

storing predetermined valid upper and lower weight limits in the memory;

weighing said bundle on the scale;

comparing the bundle weight with the valid upper and lower limits for said bundle stored in the memory;

providing an indication when the bundle weight is outside of said valid limits;

storing the bundle weights for a predetermined number of bundles of the desired bundle count in the memory;

disposing of the oldest weight stored when the stored bundle weights reach the maximum number of bundle weights stored in memory;

calculating an average bundle weight from the bundle weights stored in memory;

adding a first factor stored in said memory to the average bundle weight to develop a high valid weight limit;

subtracting a second factor stored in said memory from the average bundle weight to develop a low valid weight; and storing the low and high valid weights for use in verifying the next strapped bundle of the denomination and quantity.

2. The method of claim 1 further comprising the step of adding a truncate factor to the bundle weight obtained from the scale and truncating the resultant value to the desired decimal place.

3. The method of claim 1 wherein the bundle weights are stored in binary format and including means for adding a factor to the average bundle value and truncating the resultant value to the proper decimal place to compensate for the loss of a fraction of weight due to the employment of binary notation representing bundle weights.

4. The method of claim 1 wherein the bundle weights are stored in binary format and including the step of adding a factor to the average bundle weight value and truncating the resultant value to the proper decimal place to compensate for the loss of a fraction of weight due to the employment of binary notation for storing bundle weights.

5. The method of claim 1 further comprising the steps of dividing the calculated average bundle weight by the number of sheets in a bundle to obtain a single sheet weight;

adding a truncate factor stored in memory to the single sheet weight and storing the resulting value.

6. The method of claim 5 further comprising the step of adding the single weight and the truncate factor to the single total weight and storing the result; and repeating the previous steps a predetermined number of times to develop a table containing weight values for single sheet, two-sheet, three-sheet, . . . through n-sheet bundles, to facilitate a counting operation for counting bundles of unstrapped sheets having between 1 and n sheets.

7. The method of claim 6 further comprising the step of performing a counting operation of an unstrapped bundle by weighing the unstrapped bundle;

storing predetermined upper and lower weight limits for a single sheet in memory;

comparing the weight of the unstrapped bundle against the low and high weight values for a single sheet contained in said table;

comparing the unstrapped bundle being weighed against the next largest high and low valid bundle values contained in said table in the event that the bundle weight does not lie between the low and high valid weights utilized in the previous comparison;

counting the number of high/low comparisons performed; and displaying the number of sheets contained in the unstrapped bundle in accordance with the number of high/low comparisons counted, when the unstrapped bundle has a weight equal to or greater than the valid low and equal to or less than the valid high for an unstrapped bundle of a predetermined count.

8. The method of claim 1 further comprising the steps of selecting the valid low and high weight limits by comparing the weight value and the bundle against a first predetermined value;

selecting the valid low and high limits of a strapped bundle of a first count, if the weight of the bundle exceeds a first predetermined value;

selecting the valid low and high weight limits of a strapped bundle of a second count, if the weight value of the bundle is less than said first predetermined value and greater than a second predetermined value.

9. The method of claim 8 further comprising the step of counting the number of bills in an unstrapped bundle by comparing the weight of the bundle with a third predetermined value, and comparing the weight of the bundle with the value low and high weight limits of a single bill.

10. The method of claim 9 further comprising the step of displaying the count of a single bill, if the weight of the bundle lies between the valid low and high limits of a single bill.

11. The method of claim 9 further comprising the step of comparing the weight of the bundle with the valid low and high limits of a bundle of two bills, if the weight of the bundle is greater than the valid limit for a single bill.

12. The method of claim 11 further comprising the step of displaying the count of a bundle of two bills, if the weight of the bundle lies between the valid low and high limits of a pair of bills.

13. A method for creating a table of stored values in a computer coupled to an electronic scale, and having a memory for verifying the number of sheets contained within a strapped bundle having a predetermined number of sheets comprising the steps of:

weighing the strapped bundle on said scale;

inserting the weight value into each location in memory within a table having a predetermined number of storage locations;

multiplying the weight of the strapped bundle by a number equal to the number of storage locations in said table to obtain a total weight;

subtracting the value in the first storage position in the table from the product of said multiplication;

moving each of the values in the remaining positions in said table up by one location towards said first location;

inserting the newly obtained weight into the last storage location in said table, and adding the newly obtained weight to the total weight;

adding a factor to the total weight to compensate for the strap weight;

dividing the total weight by a number equal to the number of positions in said table to obtain a calculated average weight;

adding a factor to the calculated average weight to form a valid high weight and storing said valid high weight in said memory;

subtracting a factor from the calculated average weight to form a valid low weight and placing said valid low weight in said memory to provide a comparison table to use in verifying the weight of the next strapped bundle of purportedly the same count.

14. The method of claim 13 further comprising the steps of:

weighing the next strapped bundle to be verified on said scale;

comparing the weight of the said next strapped bundle with the valid high and low weights for the desired count from said comparison table; and verifying the count of said strapped bundle if the weight of said next weighed bundle is not less than the low valid weight and no greater than the high valid weight.

15. The method of claim 14 further comprising the step of providing an error display if the weight of said next weighed bundle is either greater than the high valid weight or less than the low valid weight.

16. The method of claim 13, wherein the strapped bundle to be verified contains a first predetermined number of sheets and further comprising the steps of creating a table comprised of predetermined storage locations in memory for counting unstrapped sheets from the average strapped bundle weight comprising the steps of:

dividing the total average weight stored in memory by the number of sheets in the strapped bundle to obtain a single bill weight;

adding a truncate factor to said single bill weight and placing the total single bill weight in the first counting table location;

adding the single bill weight and the truncate factor to the previous single total weight and placing said value in the second counting table position;

repeating the aforementioned steps until a predetermined number of bill weights for counts of from one sheet to a predetermined multiple number of sheets are stored in respective locations in said counting table for use in counting unstrapped bundles of sheets up to said maximum predetermined number.

17. The method of claim 16 further comprising the steps of determining the count of an unstrapped bundle by performing the additional steps of:

weighing the unstrapped bundle on said scale;

comparing the unstrapped bundle weight against the low and high valid weights stored in the first location in the counting table for determining if the weight of the unstrapped bundle falls between the upper and lower valid weights for a single sheet;

successively comparing the weight of the unstrapped bundle against the high and low valid weights stored in each successive counting table location until the weight of the unstrapped bundle is found to lie between the upper and lower valid weights of one of the count values stored in said counting table;

halting the comparison operations and displaying the valid count.

18. The method of claim 17 further comprising means for displaying an excess weight message when the weight of the unstrapped bundle is greater than the largest valid high weight value stored within the counting table.

19. The method of claim 13, wherein the strapped bundle contains a predetermined number of sheets further comprising method steps for creating high and low valid weight values for verifying strapped bundles containing a quantity of sheets smaller than said first-mentioned strapped bundle, said method steps including;

adding and subtracting a factor from the single piece weight calibrated from said average weight to form a valid high and low weight value for a single piece;

adding the total weight of ten strapped bundles five times and storing the result in memory;

adding a truncate factor to the resulting sum;

dividing the total of the resulting sum and the truncate factor by ten to obtain the weight of a pack of fifty sheets;

adding a factor to the fifty sheet pack weight to obtain a valid high weight;

subtracting a factor from the fifty sheet pack weight to obtain the valid low weight;

storing the valid high and low weights for a fifty sheet strapped bundle in a fifty sheet strapped bundle table for verifying the counts of strapped bundles of fifty sheets.

20. The method of claim 19 further comprising the steps of verifying a strapped bundle for a fifty sheet count including the steps of weighing the strapped bundle to be verified on the scale;

comparing the weight against the high valid and low valid weight values in the fifty sheet verification table;

providing a display of the correct monetary value when the weight of the fifty sheet strapped bundle is greater than the low valid weight and less than the high valid weight of the values in the fifty sheet strap value table.

21. The method of claim 20 further comprising the steps of providing an error display when the weight of the strapped bundle being verified is greater than the high valid weight or less than the low valid weight.

* * * * *

UNITED STATES PATENT AND TRADEMARK OFFICE
CERTIFICATE OF CORRECTION

PATENT NO. : 4,674,060

DATED : June 16, 1987

INVENTOR(S) : Francis Larkin and Jeffrey Amey

It is certified that error appears in the above-identified patent and that said Letters Patent are hereby corrected as shown below:

Column 10, line 27, after "valid" insert --high--.

Column 12, line 16, "subracting" should be --subtracting--.

Signed and Sealed this

Sixth Day of October, 1987

Attest:

DONALD J. QUIGG

*Attesting Officer*  *Commissioner of Patents and Trademarks*